Feb. 9, 1965  F. O. JOHNSON  3,168,893
SEMIPRECIOUS STONE CUTTING VISE
Filed Dec. 26, 1962  2 Sheets-Sheet 1

INVENTOR.
Frank O. Johnson
BY
ATTORNEY

Feb. 9, 1965   F. O. JOHNSON   3,168,893
SEMIPRECIOUS STONE CUTTING VISE
Filed Dec. 26, 1962   2 Sheets-Sheet 2
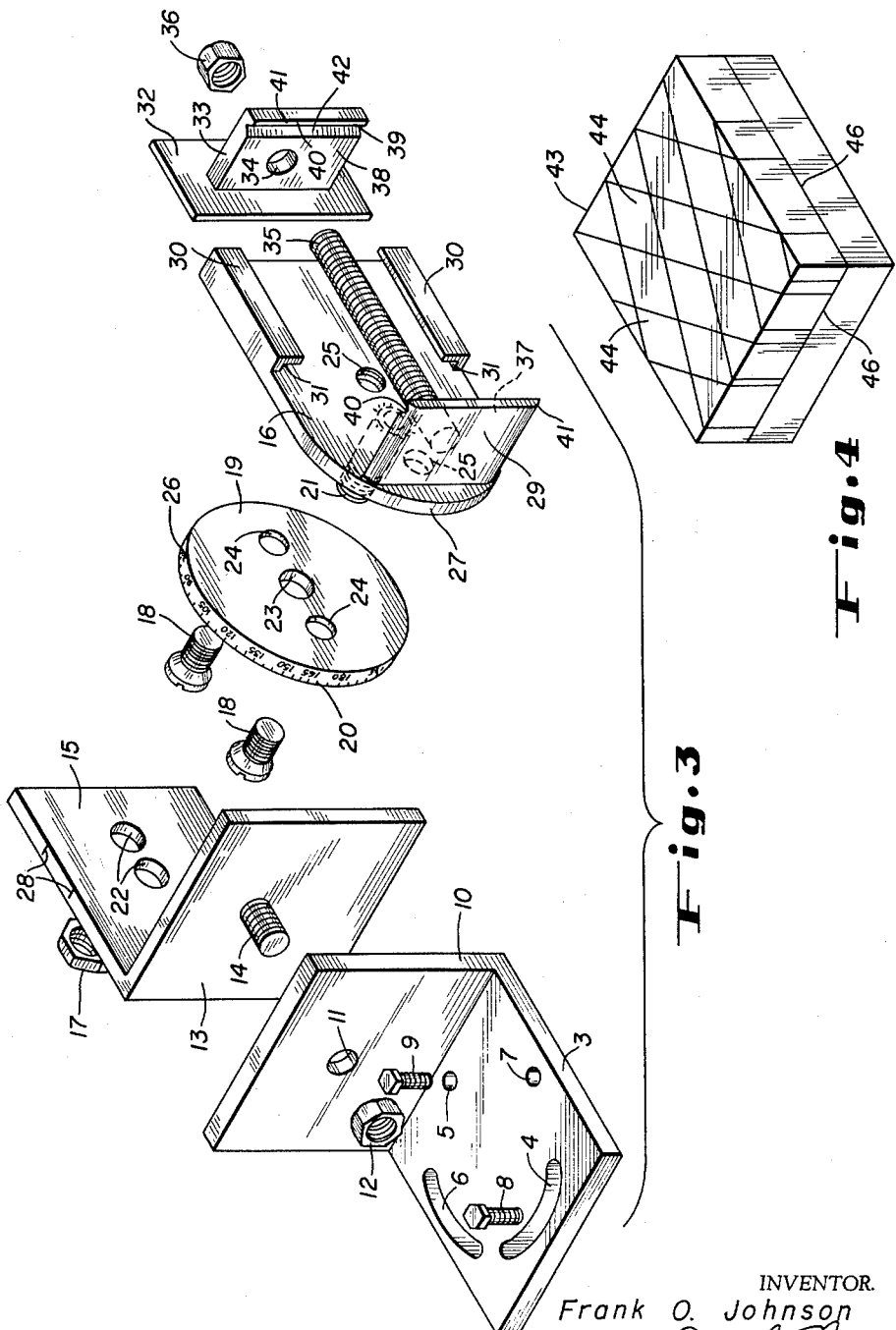
INVENTOR.
Frank O. Johnson
BY
ATTORNEY

SEMIPRECIOUS STONE CUTTING VISE
Frank O. Johnson, 1765 W. 15th St., Casper, Wyo.
Filed Dec. 26, 1962, Ser. No. 247,147
3 Claims. (Cl. 125—13)

This invention relates to a form of a vise which is especially designed for use in a rock slabbing saw, for lapidary work in the cutting of blanks to size and shape for semiprecious stone, as used in the making of jewelry and mosaic work.

In the specialized field of the lapidary, it is necessary to first cut a rough stone into slabs by use of a saw, commonly known as a "slabbing saw." The slab is then roughened into the general shape of the stone desired by use of a "trim saw." After the stone has been shaped by the trim saw, it is known as a "blank" and, by use of the grinder and polisher, the lapidarist reduces the rough stone to a finished gem.

Under the present process in use, the stone slab must be reduced by hand to a blank, by trimming off a substantial part of the stone with a trim saw, resulting in the material waste of a portion of the stone.

The process of trimming the stone into the general shape desired and above referred to as a blank, is slow and arduous. In this specialized field of precision rock cutting, it is the inventors primary object to provide a devise which will permit the cutting of a large number of blanks in one simple operation, thus saving hours of manpower and expense.

This form of vise will allow rock cutting to be done by a rock slabbing saw, reducing the time and expense of replacing diamond blades substantially below that required in cutting rock by hand on a trim saw.

These and other objects of the invention will appear more fully from the following description and the accompanying drawings, in which:

FIGURE 3 is an exploded view of the invention.

FIGURE 4 is a perspective view of a semiprecious stone showing a diamond pattern cut into its surface.

Figure 1:
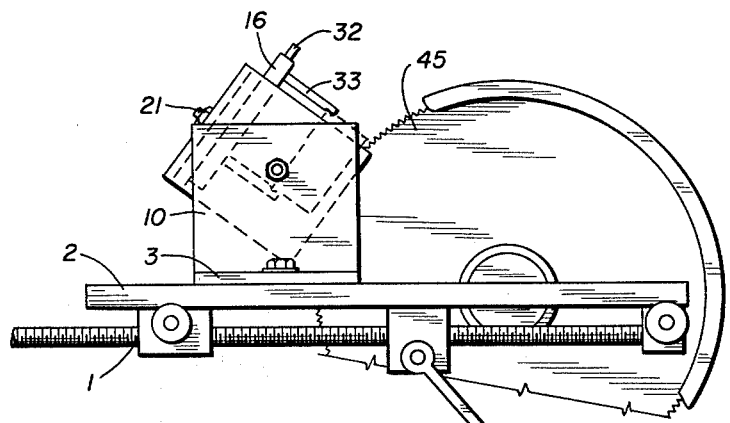
FIGURE 1 is a side elevation view showing the invention attached to a cross feed member of a regular slabbing saw, partially shown.
Figure 2:
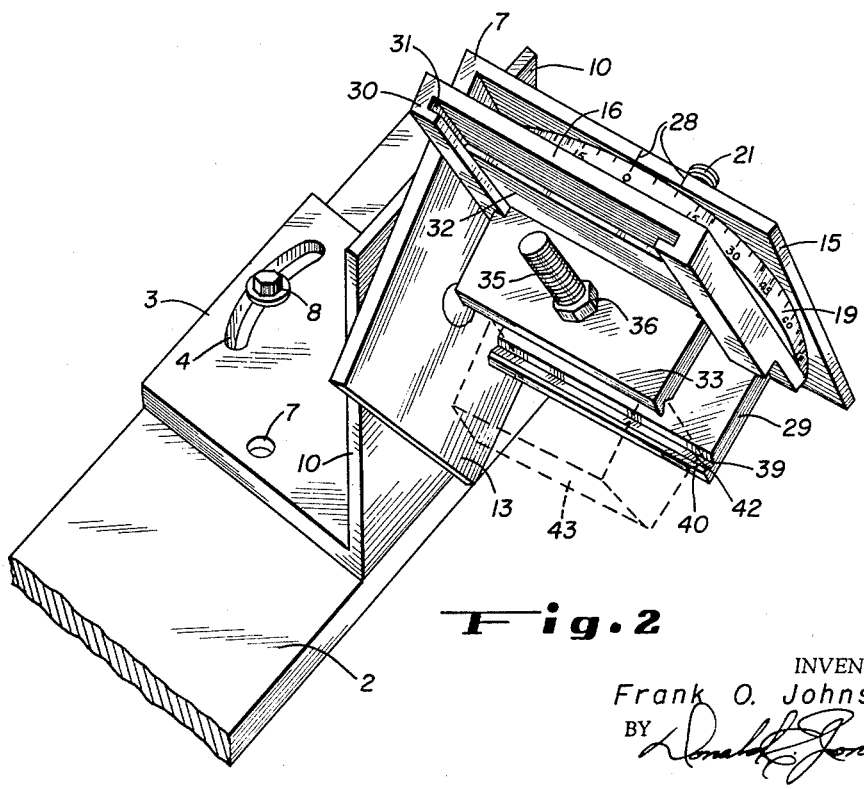
FIGURE 2 is a perspective view of the invention.

In general, the base brace 3 of the device is adjustably mounted on the cross feed member 2 of a regular slab saw carriage 1. A vise support plate 16 is rotatably mounted on a right angle vise frame 13 and 15, which is rotatably mounted on the right angle vise brace 3 and 10. The vise support plate 16 has slide guides 30 on each side which guide the slide plate 32. The moveable jaw 33 is mounted on the slide plate 32 and the stationary jaw 29 is mounted on the semi-circular end 27 of the vise support plate 16. The stone 43 is gripped between the moveable jaw 33 and the stationary jaw 29 when the nut 36 is tightened on the long threaded rod 35.

Of most importance is the necessity to allow the stone 43 to be cut at different angles through its surface and in a full variety of patterns. As shown in FIGURE 4, a diamond pattern 44 has been cut into the stone. By turning the stone at 90° and cutting through it along line 46, parallel to the surface of the stone, a multitude of small symmetrical stones are produced.

In greater detail, the base brace 3 is mounted on the cross feed member 2 by the pivotal machine bolt 9 which passes through hole 5 of the base brace 3 and the machine bolt 8 which passes through the arched aperture 4 of the base brace 3. By pivoting the base brace 3 about the machine bolt 9, the angle of the slabbing saw 45 to the stone 43 can be varied. The alternate arched aperture 6 and the alternate hole 7 allow the base brace 3 to be rotated in either direction.

The base brace 3 is bent at a right angle to form what is herein referred to as the upright brace 10. An inner vise frame 13 is rotatably connected to the upright brace 10 by the bolt 14 which is mounted on the inner vise frame 13 and passes through the hole 11 of the upright brace 10 and is secured by nut 12. The inner vise frame 13 is similarly bent at a right angle to form what is herein referred to as the back vise frame 15. By rotating the inner vise frame 13, the surface of the stone 43 can be properly set to receive the slabbing saw 45.

The vise support plate 16 is rotatably connected to the back vise frame 15 by the short threaded rod 21 and secured by the nut 17. Between the vise support plate 16 and the back vise frame 15, is a circular member 19 provided with degree indicating graduations 20. The circular member 19 is securely mounted on the vise support plate 16 by the machine bolts 18 which pass through holes 24 of the circular member 19 and screw into holes 25 in the vise support plate 16.

The short threaded rod 21 is welded to the back support plate 16 and passes through the hole 23 of the circular member 19 and through the alternative apertures 22 of the back vise frame 15. Nut 17, when tightened on the short threaded rod 21, secures the vise support plate 16, circular member 19 and back vise frame 15 tightly together. The vise plate 16 has a semi-circular end 27, which allows the plate 16 to be rotated, when the nut 17 is loosened, without striking the inner vise frame 13. The degree of rotation is accurately indicated by degree indicating graduations 20, on the periphery 26 of the circular member 19, when adjacent to the stationary marks 28 grooved into the back vise frame 15.

Integral with the semi-circular end 27 of the vise support plate 16 is the stationary jaw 29. Slide guides 30 are integral with each side of the vise support plate 16 and provide slideways 31 to contain the slide plate 32. The moveable jaw 33 is mounted on the slide plate 32. A long threaded rod 35 is welded into the stationary jaw inner face 37 and extends parallel to the vise support plate 16 as shown in FIGURE 3, and through the hole 34 in the moveable jaw 33.

The stationary jaw inner face 37 and the moveable jaw inner face 38 have the V-grooves 39 which form inset ridged grips 40 along the outer edge 41 of each jaw. These grips 40 are described as inset since the thickness through each grip is less than the thickness through the main portion of each jaw. This construction allows the inner edge of each V-groove 39 to serve as an abutment 42. The stone 43 to be cut is placed between the inset ridged grips 40 of each jaw and set against the abutments 42 of each jaw. By tightening the nut 36 on the long threaded rod 35, the stone 43 is secured and ready for the pattern cutting.

It is evident from the foregoing that the invention has been especially adapted for use in the work of a lapidary, however, it is recognized that it would be useful in any art requiring a special vise for accurate and detailed work. Also, it is recognized that the invention is capable of changes and modifications without the parting of the true spirit of the invention, therefore, the following claims are intended to cover such recognized changes, modifications and uses.

I claim as my invention:

1. A vise carried by a planar supporting member comprising a right angled base brace including a planar surface portion abutting the supporting member and being capable of limited arcuate adjustment about a pivotal connection therewith, said base brace including a planar upper brace portion, a vise frame including a planar inner frame portion and a planar back frame portion at right angles to one another, said inner frame portion being selectively, rotatably connected with the upper brace portion of the base brace about a pivot bolt extending therethrough, a planar vise support plate abutting and adjustably secured to the back frame portion of the vise frame, workholding jaws carried by said support plate, said jaws being movable relative to one another in a plane parallel to the surface of said support plate, and said vise support plate being provided with integrally formed slide guides to support and guide one of said workholding jaws.

2. A vise carried by a planar supporting member comprising a right angled base brace including a planar surface portion abutting the supporting member and being capable of limited arcuate adjustment about a pivotal connection therewith, said base brace including a planar upper brace portion, a vise frame including planar inner frame portion and a planar back frame portion at right angles to one another, said inner frame portion being selectively, rotatably connected with the upper brace portion of the base brace about a pivot bolt extending therethrough, a planar vise support plate abutting and adjustably secured to the back frame portion of the vise frame, and said vise support plate being provided with an integrally formed stationary jaw and with integrally formed slide guides to support and guide a movable jaw toward or away from said stationary jaw, in a plane parallel to the surface of said support plate.

3. A vise carried by a planar supporting member comprising a right angled base brace including a planar surface portion abutting the supporting member and being capable of limited arcuate adjustment about a pivotal connection therewith, said base brace including a planar upper brace portion, a vise frame including planar inner frame portion and a planar back frame portion at right angles to one another, said inner frame portion being selectively, rotatably connected with the upper brace portion of the base brace about a pivot bolt extending therethrough, a planar vise support plate abutting and adjustably secured to the back frame portion of the vise frame, the said vise support plate being provided with an integrally formed stationary jaw and with integrally formed slide guides to support and guide a movable jaw toward or away from said stationary jaw, in a plane parallel to the surface of said support plate, and including a circular member carried by said vise support plate and having degree indicating graduations along the periphery thereof for indicating the angular position of the vise support plate relative to the back frame portion of the vise frame.

References Cited by the Examiner
UNITED STATES PATENTS

| | | | |
|---|---|---|---|
| 648,763 | 5/00 | La Barge | 279—114 XR |
| 1,075,059 | 10/13 | Oster | 269—83 XR |
| 1,125,395 | 1/15 | Recconi | 269—95 XR |
| 1,127,708 | 2/15 | Wilber | 269—83 XR |
| 1,823,537 | 9/31 | Gaudreau | 269—241 |
| 2,432,058 | 12/47 | Wiken et al. | 51—220 |
| 3,024,018 | 3/62 | Manz. | |

ROBERT C. RIORDON, *Primary Examiner.*